May 20, 1924.

F. D. HOLDSWORTH

COMPRESSOR SYSTEM

Filed Feb. 17, 1923

1,494,957

Inventor:
Fred D. Holdsworth.
by
Attorney.

Patented May 20, 1924.

1,494,957

UNITED STATES PATENT OFFICE.

FRED D. HOLDSWORTH, OF CLAREMONT, NEW HAMPSHIRE, ASSIGNOR TO SULLIVAN MACHINERY COMPANY, A CORPORATION OF MASSACHUSETTS.

COMPRESSOR SYSTEM.

Application filed February 17, 1923. Serial No. 619,614.

*To all whom it may concern:*

Be it known that I, FRED D. HOLDSWORTH, a citizen of the United States, residing at Claremont, in the county of Sullivan and State of New Hampshire, have invented certain new and useful Improvements in Compressor Systems, of which the following is a full, clear, and exact specification.

My invention relates to compressor systems, and more particularly to such systems of the automatically controlled type.

An object of my invention is to provide an improved compressor system. Another object of my invention is to provide an improved compressor drive controlling mechanism. A further object of my invention is to provide an improved compressor system comprising a motor driven compressor and means of improved nature for controlling the driving of the compressor by the motor. A still further object of my invention is to provide an improved compressor system comprising a compressor, a synchronous motor operating the same, and improved controlling mechanism responsive to receiver pressure for controlling the operation of the synchronous motor. Other objects and advantages of my invention will hereinafter more fully appear.

In the accompanying drawings I have shown for purposes of illustration, one form which my invention may assume in practice.

In these drawings,—

Figure 1:
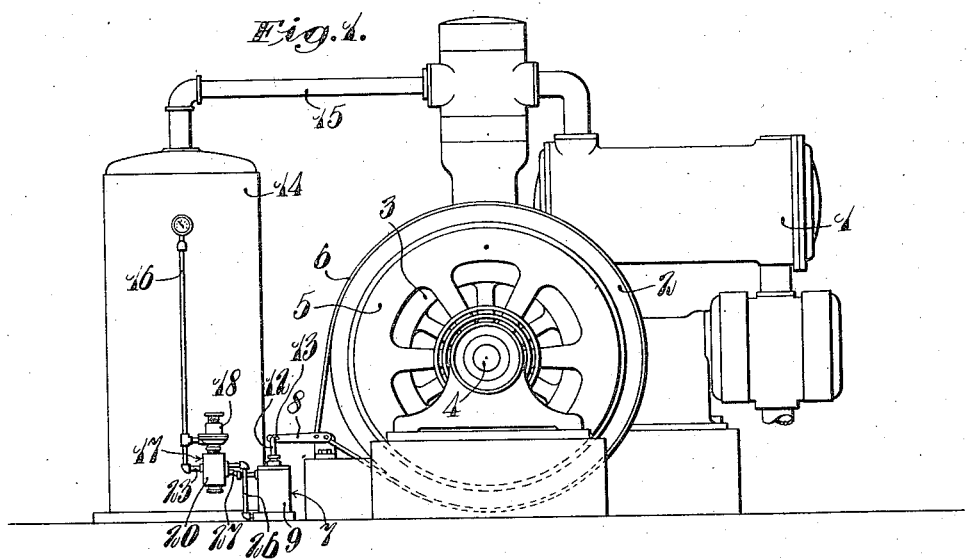
Fig. 1 is a side elevation with details omitted of the illustrative embodiment of my invention.

It is a well-known fact that a synchronous motor drive is quite desirable for use in connection with air compressors. Heretofore in the employment of such a drive it has, however, been found requisite to cause the compressor driving motor to run continuously and to unload the compressor when further air was not desired for a short period, this in view of the starting characteristics of such motors. According to my invention it is possible, although still employing a synchronous motor, to use the system of compressor control wherein compressor drive is interrupted when for a period no further air need be compressed, although it will be understood that where very frequent interruptions of air compression are necessary, this system may not be especially advantageous.

In the embodiment of my invention which I have disclosed for purposes of illustration, I have shown a compressor, herein of the angle compound type, 1, which is driven by a motor, herein a synchronous motor, 2, whose details of construction are only diagrammatically shown and which comprises a field 3, which is directly connected through a shaft 4 to the compressor 1 and serves to drive the latter, and an armature 5. The armature is herein journaled for rotation in bearings concentric with the bearings for the field, although it will be understood that it may be journaled simply upon the shaft 4 or otherwise as preferred. As a result the armature is free to rotate and as rotation of the field is impeded by the necessity of doing work in turning over the compressor, upon supply of current to the motor, the armature will come up to synchronous speed while the field remains stationary. For the purpose of braking the armature and thereby causing the field to rotate, there is provided a brake band 6 surrounding the armature. The details of the motor require no further disclosure since such motors having both field and armature rotatably supported, together with braking means for the armature are per se old. For the purpose of controlling the brake band I provide mechanism which comprises a lever 8 which, when its free end is moved, downwardly, applies the brake band 6, and operating means for the lever including a cylinder 9 in whose bore 10 a piston 11 having a piston rod 12 is reciprocable, the piston rod 12 being connected by a slot and pin connection 13 with the lever 8. For the purpose of governing the reciprocation of the piston 11 and so the applying and releasing of the brake band 6, I have shown a compressor discharge pressure controlled valve mechanism. A receiver 14 receives air through the pipe 15 from the compressor and a line 16 leads from the receiver and conducts receiver pressure to the controlling valve mechanism which is generally designated 17. The line 16 is herein shown as branched, one branch leading to a pilot valve 18 of the so-called Judson type. This pilot valve is now so well-known that no detailed description thereof is believed necessary, it being sufficient to state that when receiver pressure rises above the limit for which the valve is set the valve opens and supplies receiver pressure to the mechanism which it controls, while when the receiver pressure falls below a desired limit the supply through the valve is interrupted and the air previously supplied is permitted to escape through a suitable vent. Herein the pilot valve 18 supplies pressure through a port 19, to a casing 20 in whose bore 21 a three-spool piston valve 22 is reciprocable. The casing 20 receives about midway of its length a supply of air through a connection 23 which is herein shown as connected to the other branch of the pipe 16, but which in practice might perhaps better be lead directly to the receiver so that the pilot valve might not be subjected to fluctuations resulting from passage of air to the cylinder 9. Spaced exhaust ports 24 and 25 are arranged respectively above and below the communication of the passage 23 with the casing 20. At the opposite side of the casing 20 there are arranged connections 26 and 27 leading respectively to the bottom and top of the cylinder 9. A spring 28 is arranged below the piston valve 22 and normally maintains the same in raised position, the piston 22 when in raised position, operating by its lower groove 29 to supply air on top of the piston 11 to apply the brake while its upper groove 30 serves to connect the lower end of the cylinder 9 through the connection 26, with the atmospheric vent 24. In the position shown herein, the pilot valve 18 is open and the piston valve 22 down, and fluid pressure is passing from the line 23 through the groove 30 and the line 26 to the lower end of the bore 10 and moving the piston 11 upward to release the brake and permit rotation of the armature 5, while at the same time of course the top end of the bore 10 is vented through the passage 27, groove 29 and port 25, whereupon the field 3 will stop rotating.

Figure 2:
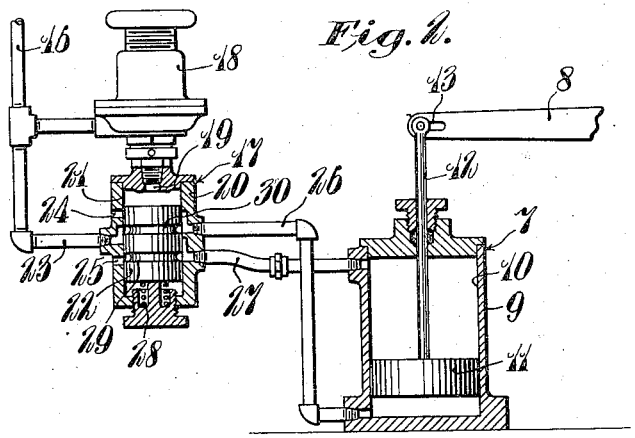
Fig. 2 is a view, partially in elevation and partially in central vertical section, through a portion of the controlling mechanism.

The mode of operation of this device will have already been clearly understood, but it may be briefly described as follows: When the compressor is running and owing to a cessation or reduction in the demand for air, receiver pressure goes up above the limit for which the pilot valve 18 is set, the pilot valve will be opened by pressure passing through the line 16 and air being supplied to the port 19 will force downward the piston 22 to the position shown in Figure 2 and so cause air to be supplied through the line 23, groove 30 and pipe 26 to act upon the lower surface of the piston 11 while the upper end of the cylinder bore 10 will be vented through the pipe 27, groove 29 and port 25. As a result, the brake lever 8 will be pushed up, causing the brake to be released and so, since the armature may freely rotate and work must be done in order for the field to rotate, the field will come to a stop while the armature becomes the rotating member. When the pressure in the receiver falls below the desired limit, the pilot valve 18 will vent the upper end of the bore 21, the valve 22 will be moved upward by the spring 28 and air will be supplied to the upper end of the cylinder 9, while the lower end of the latter is vented and so the brake lever 8 will be operated to apply the brake band 6 and so cause the field 3 to take up the drive of the compressor 1. In order that the brake application may be suitably regulated and not too sudden, the line 27 may be throttled or a dashpot may be provided if preferred.

While I have in this application specifically described one form which my invention may assume in practice, it will be understood that this form of the same is shown for purposes of illustration and that the invention may be modified and embodied in other forms without departing from the spirit or the scope of the appended claims.

What I claim as new and desire to secure by Letters Patent is:

1. In a compressor system, in combination, a compressor, driving means therefor comprising a plurality of cooperating elements each mounted for rotation and each rotatable on supply of power medium when the other is held stationary, one of said elements being connected in driving relation with said compressor, and means controlled by terminal pressure for controlling the rotation of the other of said elements.

2. In a compressor system, in combination, a compressor, driving means therefor comprising a plurality of elements each mounted for rotation and each rotatable on supply of power medium when the other is held stationary, one of said elements being connected in driving relation with said compressor, and automatic means for braking the other of said elements to interrupt rotation thereof.

3. In a compressor system, in combination, a compressor, driving means therefor comprising a plurality of elements each mounted for rotation and each rotatable on supply of power medium when the other is held stationary, one of said elements being connected in driving relation with said compressor, and means controlled by demand for air for braking the other of said elements to interrupt rotation thereof.

4. In a compressor system, in combination, a compressor, driving means therefor comprising a plurality of elements each mounted for rotation and each rotatable on supply of power medium when the other is held stationary, one of said elements being connected in driving relation with said compressor, and means controlled by compressor discharge pressure variations for braking the other of said elements to interrupt rotation thereof.

5. In a compressor system, in combination, a compressor, driving means therefor comprising a plurality of elements each mounted for rotation and each rotatable on supply of power medium when the other is held stationary, one of said elements being connected in driving relation with said compressor, and means controlled by compressor discharge pressure variations for braking the other of said elements to interrupt rotation thereof, said last mentioned means including a servo-motor and a compressor discharge pressure controlled valve mechanism therefor.

6. In a compressor system, in combination, a compressor, driving means therefor comprising a synchronous motor having its rotor and stator both journaled for rotation, means for braking the stator, and means controlled by compressor discharge pressure for applying said braking means.

7. In a compressor system, in combination, a compressor, driving means therefor comprising a synchronous motor having its rotor and stator both journaled for rotation, means for braking the stator, and means controlled by compressor discharge pressure for applying said braking means and including a servo-motor and valve mechanism controlled by compressor discharge pressure.

8. In a compressor system, in combination, a compressor, driving means therefor comprising a synchronous motor having its rotor and stator both journaled for rotation, means for braking the stator, and means controlled by compressor discharge pressure for applying said braking means and including a compressor discharge pressure operated servo-motor and valve mechanism controlled by compressor discharge pressure.

In testimony whereof I affix my signature.

FRED D. HOLDSWORTH.